US011248496B2

(12) United States Patent
Kadowaki (10) Patent No.: US 11,248,496 B2
(45) Date of Patent: Feb. 15, 2022

(54) CENTER VENT TUBE SUPPORT DEVICE OF TURBOFAN ENGINE

(71) Applicant: IHI CORPORATION, Koto-ku (JP)

(72) Inventor: Masayuki Kadowaki, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 53 days.

(21) Appl. No.: 16/810,922

(22) Filed: Mar. 6, 2020

(65) Prior Publication Data

US 2020/0208539 A1    Jul. 2, 2020

Related U.S. Application Data

(63) Continuation of application No. PCT/JP2018/035769, filed on Sep. 26, 2018.

(30) Foreign Application Priority Data

Oct. 2, 2017  (JP) .............................. JP2017-192744

(51) Int. Cl.
*F01D 25/28* (2006.01)
*F02C 7/00* (2006.01)
*F02K 3/06* (2006.01)

(52) U.S. Cl.
CPC ................ *F01D 25/28* (2013.01); *F02C 7/00* (2013.01); *F02K 3/06* (2013.01);
(Continued)

(58) Field of Classification Search
CPC .............. F01D 25/28; F05D 2220/323; F05D 2230/60; F05D 2240/55; F05D 2240/61; F05D 2260/30; F02K 3/06; F02C 7/00
See application file for complete search history.

(56) References Cited

U.S. PATENT DOCUMENTS 5,280,736 A * 1/1994 Wesling .................. F01D 5/027
464/180
2004/0025494 A1* 2/2004 Vache ...................... F02C 7/00
60/226.1
(Continued)

FOREIGN PATENT DOCUMENTS

CN     202926472 U     5/2013
FR     2 957 973 A1    9/2011
(Continued)

OTHER PUBLICATIONS

Extended European Search Report dated Jan. 13, 2021 in corresponding European Patent Application No. 18863980.1, 9 pages.
(Continued)

*Primary Examiner* — Shafiq Mian
(74) *Attorney, Agent, or Firm* — Oblon, McClelland, Maier & Neustadt, L.L.P.

(57) ABSTRACT

A center vent tube support device includes: an annular sleeve having an inner surface that comes into contact with an outer surface of a center vent tube; a ring formed of a pair of segments and placed between the sleeve and a shaft; and an annular nut for fixing the ring to the sleeve. An outer surface of the sleeve or the nut includes a pressurizing surface formed as a conical surface. Each ring segment includes a supporting surface formed as a cylindrical surface having a diameter equal to an inner diameter of the main shaft in a portion where the device is installed, a bearing surface formed as a conical surface having a vertex angle equal to that of the conical surface forming the pressurizing surface, a pair of side surfaces, and a pair of end faces formed as planes each spaced from a plane including the axis.

2 Claims, 9 Drawing Sheets

(52) U.S. Cl.
CPC .... *F05D 2220/323* (2013.01); *F05D 2230/60* (2013.01); *F05D 2240/55* (2013.01); *F05D 2240/61* (2013.01); *F05D 2260/30* (2013.01)

(56) References Cited

U.S. PATENT DOCUMENTS

| | | | |
|---|---|---|---|
| 2009/0282679 A1 | 11/2009 | Mons et al. | |
| 2015/0260231 A1* | 9/2015 | Fukutani | F01D 5/066 403/299 |
| 2017/0114643 A1* | 4/2017 | Kolk | F01D 5/066 |
| 2017/0191416 A1 | 7/2017 | Amano et al. | |
| 2017/0218766 A1* | 8/2017 | Amano | F01D 25/00 |

FOREIGN PATENT DOCUMENTS

| | | |
|---|---|---|
| FR | 3 007 789 A1 | 1/2015 |
| JP | 2004-514841 A | 5/2004 |
| JP | 2009-174528 A | 8/2009 |
| JP | 2016-138458 A | 8/2016 |
| WO | WO 2015/004357 A1 | 1/2015 |
| WO | WO 2016/075984 A1 | 5/2016 |

OTHER PUBLICATIONS

International Search Report dated Dec. 4, 2018 in PCT/JP2018/035769 filed on Sep. 26, 2018, 2 pages.

* cited by examiner

CENTER VENT TUBE SUPPORT DEVICE OF TURBOFAN ENGINE

TECHNICAL FIELD

The present disclosure relates to a device for supporting a center vent tube inside a hollow main shaft of a turbofan engine.

BACKGROUND ART

Figure 1:
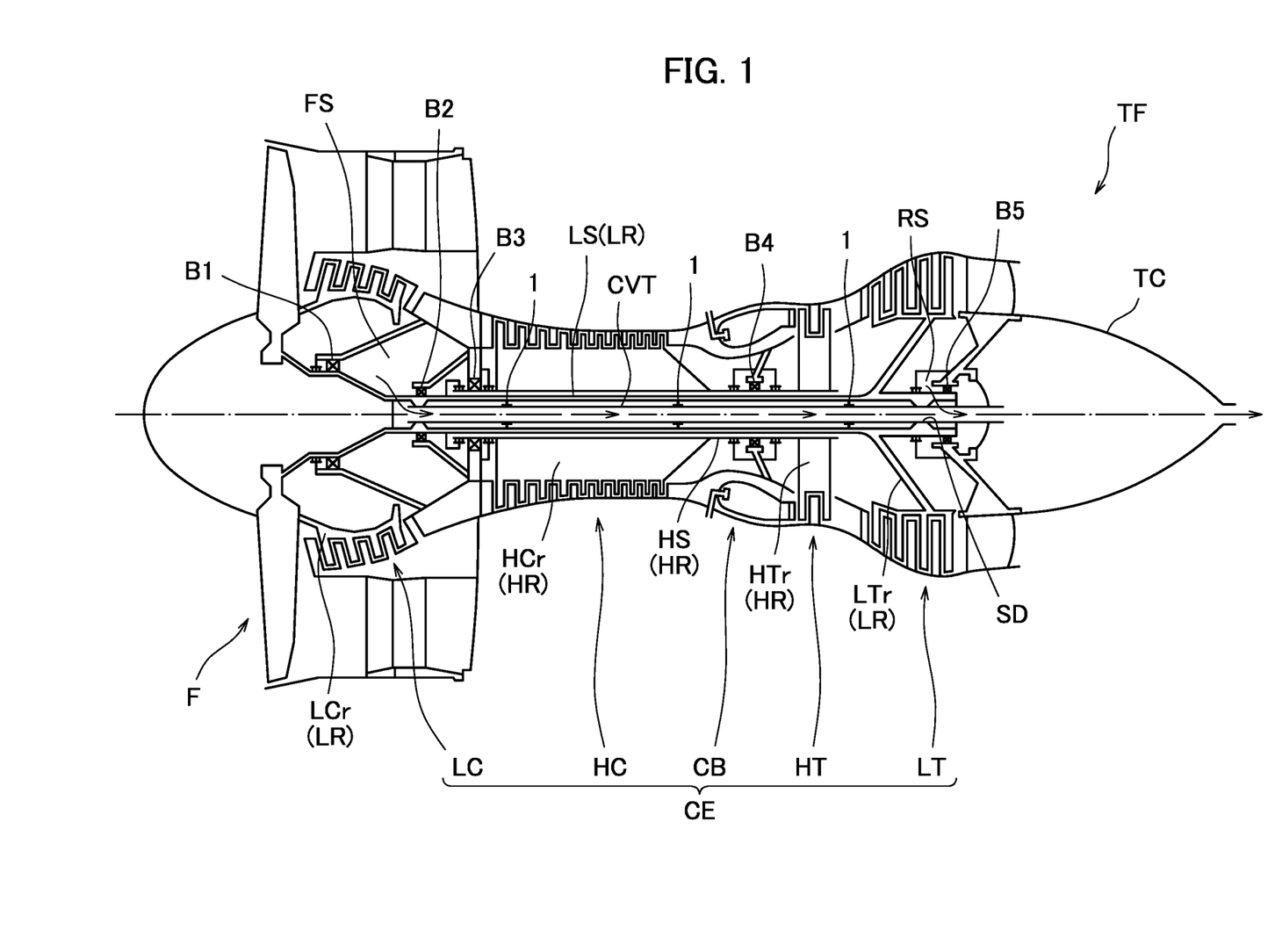
FIG. 1 is a schematic cross-sectional view of a turbofan engine adopting a center vent tube support device of an embodiment of the present disclosure.

As shown in FIG. 1, a turbofan engine TF is composed of a fan F placed in the foremost portion, and a core engine CE placed coaxially with and behind the fan F.

In the case of the twin-spool turbofan engine TF, the core engine CE includes a low pressure compressor LC, a high pressure compressor HC, a combustor CB, a high pressure turbine HT, and a low pressure turbine LT in this order from the front (upstream side) to the rear (downstream side). A rotor HTr of the high pressure turbine HT rotates a rotor HCr of the high pressure compressor HC through a high pressure shaft HS, and a rotor LTr of the low pressure turbine LT rotates the fan F and a rotor LCr of the low pressure compressor LC through a low pressure shaft LS.

Note that the fan F and the rotor LCr of the low pressure compressor LC, the low pressure shaft LS, and the rotor LTr of the low pressure turbine LT are collectively referred to as a low-pressure rotor LR, and the rotor HCr of the high pressure compressor HC, the high pressure shaft HS, and the rotor HTr of the high pressure turbine HT are collectively referred to as a high-pressure rotor HR. Additionally, both the high pressure shaft HS and the low pressure shaft LS (the two are collectively referred to as main shaft) are hollow shafts, and the low pressure shaft LS is placed inside the high pressure shaft HS.

During operation of the turbofan engine TF, a part of air sucked in and compressed by the fan F flows into the core engine CE, contributes to generation of high-temperature and high-pressure gas for driving the low pressure turbine LT which is the rotary drive source of the fan F and the low pressure compressor LC, and the rest of the air bypasses the core engine CE and is discharged from the rear to contribute to generation of a large part of thrust.

Incidentally, the low-pressure rotor LR is conventionally supported by bearings (reference numerals B1, B2, and B5 in FIG. 1) at the front of a front end portion of the high-pressure rotor HR and at the rear of a rear end portion of the high-pressure rotor HR.

Similarly, the high-pressure rotor HR is supported by bearings (reference numerals B3 and B4 in FIG. 1) at the front of the high pressure compressor HC and at the front of the high pressure turbine HT. Note that the bearing B4 that supports a rear portion of the high-pressure rotor HR is placed at the rear of the high pressure turbine HT in some cases.

Each of the bearings supports the main shaft rotating at high speed, and therefore is lubricated directly by an oil jet injected from a nozzle, or indirectly by forcibly supplying a lubricating oil to the rolling elements through the inner diameter side of an inner ring. For this reason, the bearings are placed inside a sump. In one embodiment, one bearing may be placed inside a dedicated sump, or multiple bearings placed close to one another may be placed inside a shared sump. In the turbofan engine TF shown in FIG. 1, the bearings B1, B2, and B3, the bearing B4, and the bearing B5 are each placed inside one sump.

Oil mist generated by lubricating oil supplied to lubricate the bearing and having splashed on the rotor is filled inside the sumps. Hence, a shaft seal such as a labyrinth seal or a carbon seal is placed in an axial end portion (part where main shaft penetrates) of the sump, and air extracted from an appropriate stage of the low pressure compressor LC or the high pressure compressor HC is caused to flow into the sump through the shaft seal to prevent leakage of the oil mist to the outside of the sump.

The air that flows into the sump is cleared of the oil mist by an oil separator and then is discharged to the outside of the engine. The discharge of air may be carried out through piping laid along a stationary structure of the engine or may be carried out through piping placed inside the low pressure shaft LS. The latter piping is referred to as a center vent tube.

The turbofan engine TF shown in FIG. 1 is configured such that discharge of air from a front sump FS accommodating the bearings B1, B2, and B3 and a rear sump RS accommodating the bearing B5 is carried out through a center vent tube CVT placed inside the low pressure shaft LS.

In a front end portion of the center vent tube CVT, air from the front sump FS flows in (see arrow in FIG. 1) through a hole (not shown) penetrating the low pressure shaft LS in the radial direction. At this time, the oil mist mixed with air is separated by the effect of centrifugal force in an oil separator (not shown) attached to the through hole of the low pressure shaft LS, and is returned into the sump FS. The air cleared of the oil mist flows to the rear (see arrow in FIG. 1) inside the center vent tube CVT, passes through a hole (not shown) penetrating the low pressure shaft LS in the radial direction, and merges with air flowing in (see arrow in FIG. 1) from the rear sump RS. At this time, the slight amount of oil mist left in the air having flowed down from the front sump FS is also separated in the end in an oil separator (not shown) attached to the through hole of the low pressure shaft LS, and is returned to the rear sump RS. Thereafter, the air is discharged to the inside of a tail cone TC from a rear end portion of the center vent tube CVT, and is released to the outside of the engine (see arrow in FIG. 1) from a rear end portion of the tail cone TC in the end, by the effect of negative pressure generated by an exhaust stream from the low pressure turbine LT.

As mentioned above, the center vent tube CVT is a member having only the function of discharging air from the sump, and, unlike the low pressure shaft LS having the torque transmission function, does not require high structural strength, and therefore is reduced in weight by being formed as a thin cylinder. Additionally, the center vent tube CVT is also a long member extending over almost the entire length of the low pressure shaft LS. Hence, the center vent tube CVT has low stiffness, and when placed inside the low pressure shaft LS, the center vent tube CVT needs to be supported by restricting radial displacement at multiple points in the axial direction to prevent resonance during operation of the engine.

As a device for supporting a center vent tube in such a manner inside a hollow main shaft of a turbofan engine, a technique of Patent Document 1 has been known.

This support device includes an annular sleeve ("sheath 9") having an inner surface that is in contact with an outer surface of an "annular portion 3a" of a center vent tube ("tube 3"), a ring ("ring 12") placed between the sleeve and a shaft ("low pressure turbine shaft 7"), and an annular nut ("nut 14") for fixing the ring to the sleeve. An outer surface of the sleeve and an inner surface of the ring are formed as parts of a conical surface having an equivalent vertex angle (see FIG. 2).

In this support device, when the nut is screwed into the outer periphery of the sleeve, the inner surface of the ring formed as a part of the conical surface is pushed radially outward along the outer surface of the sleeve similarly formed as a part of the conical surface. As a result, the outer surface of the ring being pushed against the inner surface of the shaft generates a reactive force, the ring is held, and therefore radial displacement of the center vent tube fitted to the inner side of the sleeve is restricted.

Figure 3:
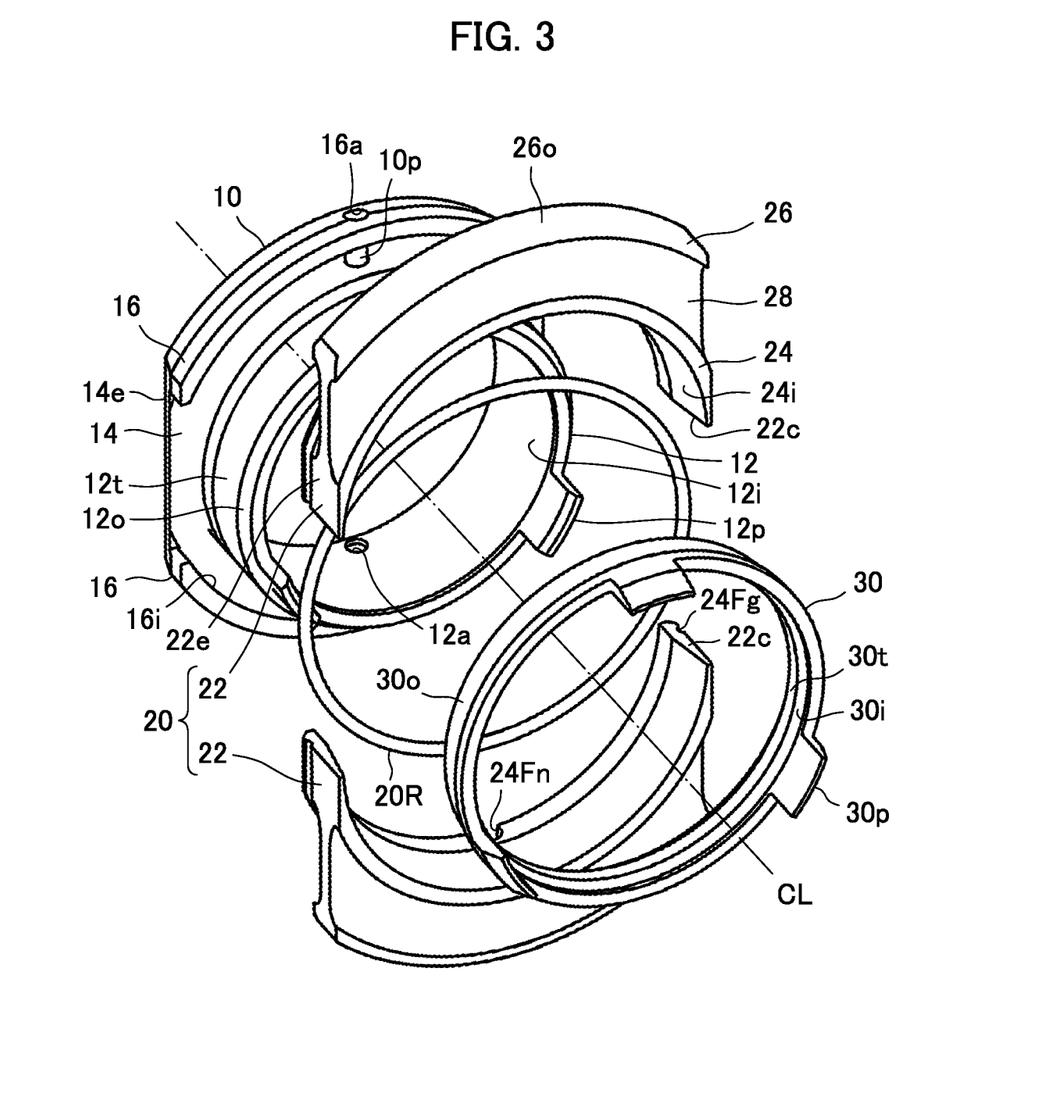
FIG. 3 is an exploded perspective view of the center vent tube support device of the embodiment of the present disclosure.

In order to be pushed outward in the radial direction in this manner, the ring of the support device of Patent Document 1 is formed in a C shape having one cutout ("slit 16") in the circumferential direction (see FIG. 3).

RELATED ART DOCUMENT

Patent Document

Patent Document 1: National Publication of International Patent Application No. 2004-514841

SUMMARY OF THE DISCLOSURE

Problems to be Solved by the Disclosure

However, the ring of the support device of Patent Document 1 is formed in a C shape, and therefore deforms asymmetrically when pushed outward in the radial direction. Meanwhile, the sleeve is in contact with the ring through the conical surface, and therefore also deforms asymmetrically in a similar manner with the asymmetrical deformation of the ring.

Such deformation causes unevenness in the circumferential direction in the contacting state between the outer surface of the ring and the inner surface of the shaft, and between the inner surface of the sleeve and the outer surface of the center vent tube. Hence, abnormal load may be transmitted between the two members, or abrasion may occur on each of the surfaces. Thus, the support device of Patent Document 1 still has room for further improvement.

The present disclosure has been made in view of the foregoing, and an object thereof is to provide a device for supporting a center vent tube inside a hollow main shaft of a turbofan engine, in which the contacting state between components does not become uneven in the circumferential direction, and therefore transmission of abnormal load between members or abrasion of a contact surface can be prevented.

Means for Solving the Problems

In order to achieve the above object, a center vent tube support device of an aspect of the present disclosure is center vent tube support device for supporting a center vent tube inside a hollow main shaft of a turbofan engine, the center vent tube support device including: an annular sleeve having an inner surface that comes into contact with an outer surface of the center vent tube; a ring formed of a pair of ring segments and placed between the sleeve and the main shaft; and an annular nut for fixing the ring to the sleeve, in which: an outer surface of the sleeve or the nut includes a pressurizing surface formed as a conical surface; each of the ring segments includes a supporting surface formed as a part of a cylindrical surface having a diameter equal to an inner diameter of the main shaft in a portion where the device is to be installed, a bearing surface formed as a part of a conical surface having a vertex angle equal to that of the conical surface forming the pressurizing surface, a pair of side surfaces formed as planes parallel to a first plane including an axis and each spaced from the first plane at a first distance, and a pair of end faces formed as planes each spaced from a second plane including the axis and perpendicular to the first plane at a second distance; the supporting surface is formed of at least a part of an outer surface of a cylindrical rim portion of the ring segment; the bearing surface is formed of at least a part of an inner surface of a cylindrical bore portion of the ring segment; a connection ring is provided around an outer surface of the bore portion of the pair of ring segments; and a diameter of a circle circumscribing a projected shape of the device in a direction perpendicular to the second plane is smaller than an inner diameter of a smallest-diameter portion of the main shaft.

Effects of the Disclosure

The center vent tube support device of the present disclosure is configured such that the ring placed between the center vent tube and the main shaft through the sleeve is formed of a pair of ring segments, and comes into contact with an inner surface of the main shaft on a supporting surface formed as a part of a cylindrical surface having a diameter equal to the inner diameter of the main shaft.

Accordingly, when bringing the supporting surface of the ring segment into contact with the inner surface of the main shaft at the time of assembly of the support device, each ring segment only moves in the radial direction and does not deform. Additionally, even after assembly, since the supporting surface of the ring segment is in close contact with the inner surface of the main shaft, there is no fear of deformation. Hence, the sleeve placed between the ring segment and the center vent tube is also unlikely to deform.

As has been described, in the center vent tube support device of the present disclosure, the contacting state between the ring and the main shaft, and between the sleeve and the center vent tube are both even in the circumferential direction. As a result, an excellent effect of preventing transmission of abnormal load between the members and preventing abrasion of the contact surface can be achieved.

MODE FOR CARRYING OUT THE DISCLOSURE

Hereinafter, an embodiment of the present disclosure will be described in detail with reference to the drawings.

FIG. 1 is a schematic cross-sectional view of the turbofan engine TF adopting a center vent tube support device (hereinafter simply referred to as support device) 1 of the embodiment of the present disclosure. Note that since the configuration of the turbofan engine TF has already been described in Background Art, description is omitted herein.

The support device 1 is used for supporting the center vent tube CVT to the inside of the low pressure shaft LS (main shaft) of the turbofan engine TF, and three support devices 1 are placed along the axial direction in the example shown in FIG. 1. Note that the number of support devices 1 to be placed can be selected appropriately to prevent resonance of the center vent tube CVT during operation of the engine.

In the following description, in a state where the support device 1 is attached to the turbofan engine TF, the front side of the engine (upstream side) and the rear side of the engine (downstream side) are referred to as the front side and the rear side of the support device 1 (and its components).

Figure 2:
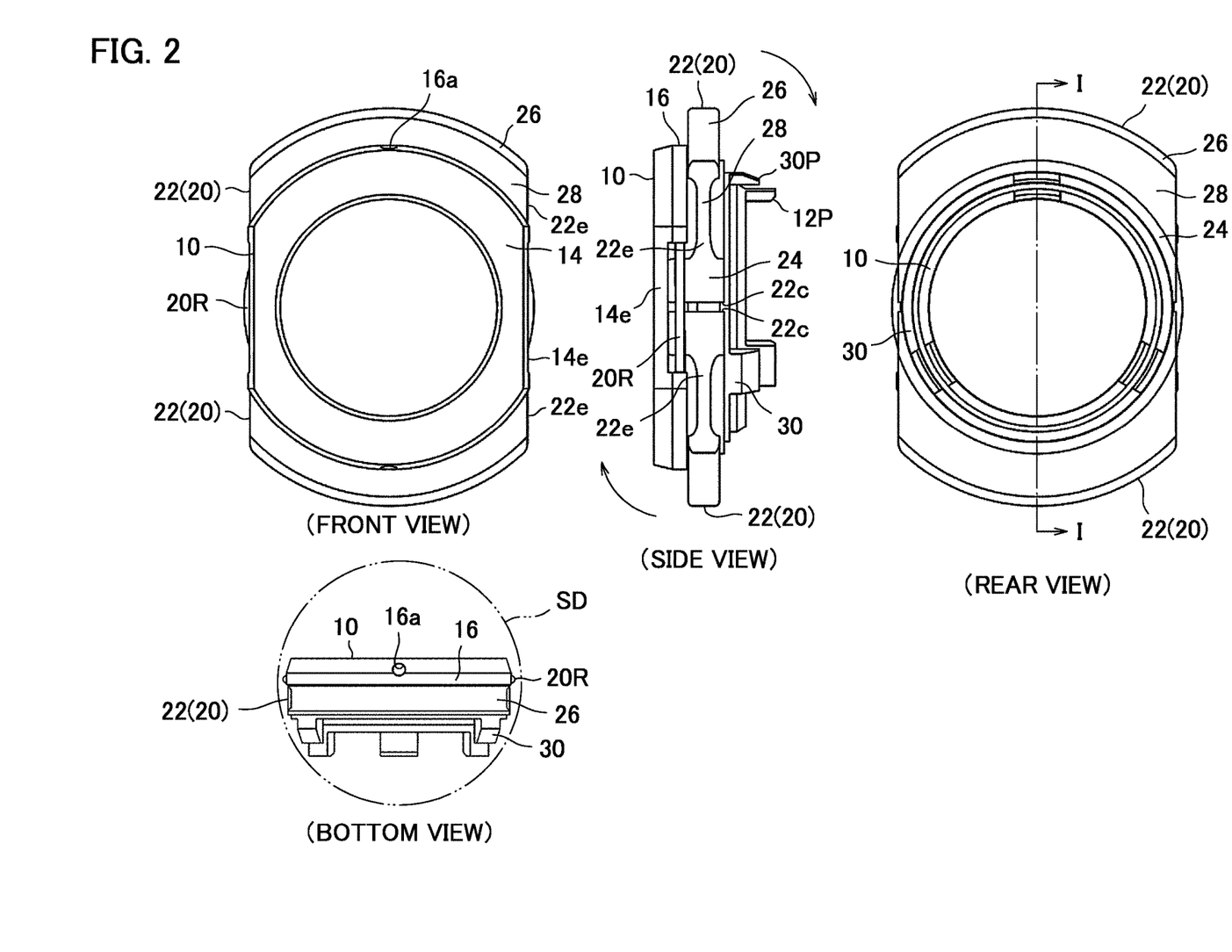
FIG. 2 shows four orthogonal views (front view, side view, rear view, and bottom view) of an assembled state of the center vent tube support device of the embodiment of the present disclosure.
Figure 4A:
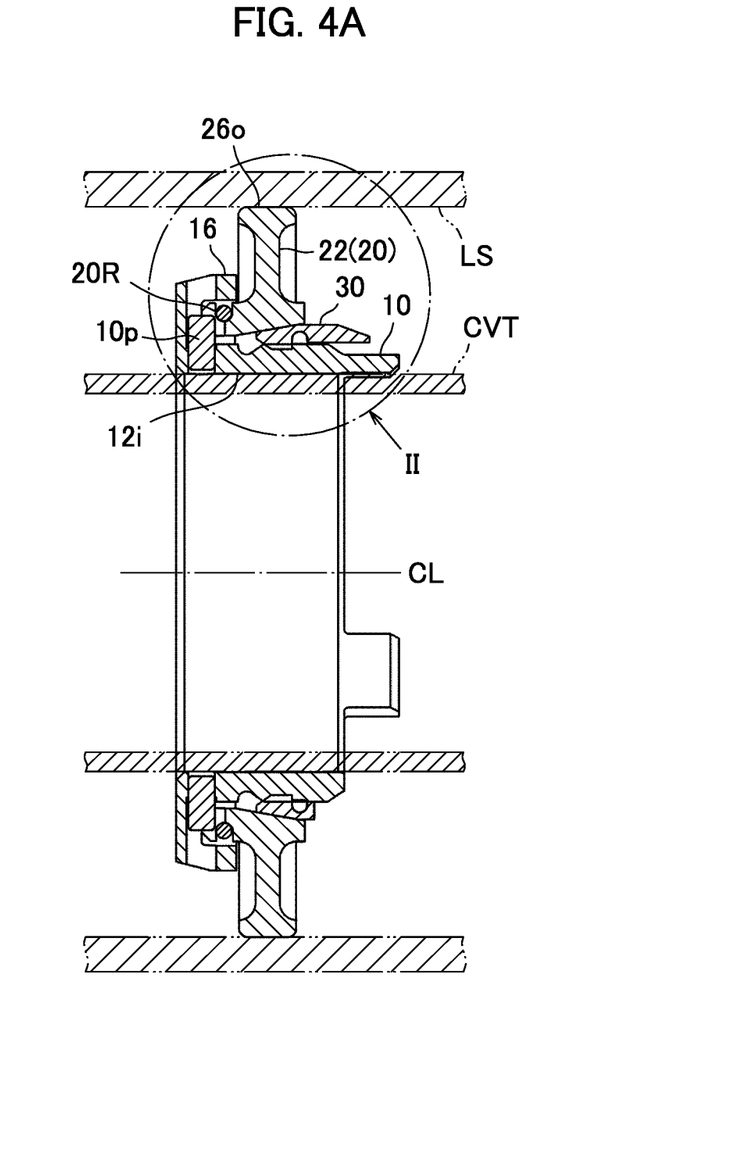
FIG. 4A is a cross-sectional view taken along I-I of FIG. 2 of the center vent tube support device of the embodiment of the present disclosure.
Figure 4B:
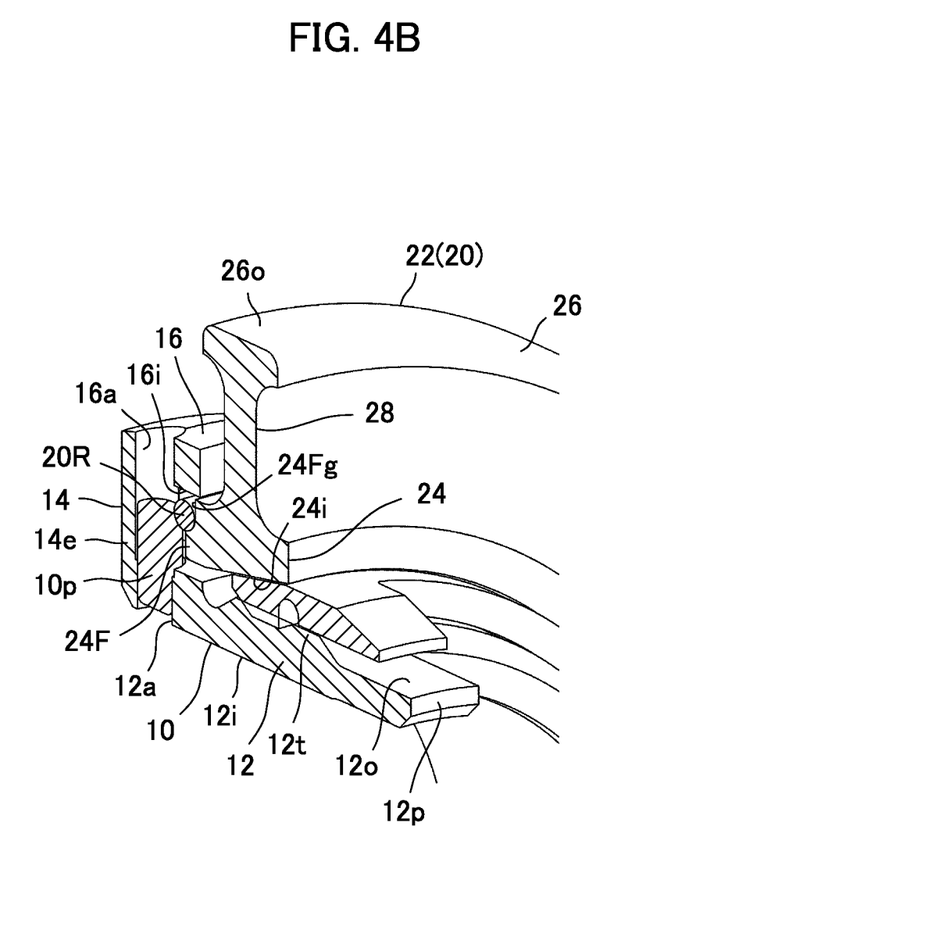
FIG. 4B is an enlarged perspective view of part II of FIG. 4A of the center vent tube support device of the embodiment of the present disclosure.

FIGS. 2 to 4B are diagrams for describing the support device 1 of the embodiment of the present disclosure, where FIG. 2 shows four orthogonal views (front view, side view, rear view, and bottom view) of an assembled state, FIG. 3 is an exploded perspective view, FIG. 4A is a cross-sectional view taken along I-I of FIG. 2, and FIG. 4B is an enlarged perspective view of part II of FIG. 4A.

The support device 1 is formed of a sleeve 10, a ring 20, and a nut 30 (in particular, see FIG. 3).

As shown in FIG. 4A, the sleeve 10 is an annular member placed outside the center vent tube CVT so as to surround the center vent tube CVT, and is formed of a cylindrical inner wall portion 12, a radial wall portion 14 that rises radially outward from the front end of the inner wall portion 12, and an outer wall portion 16 that protrudes rearward from the outer edge of the radial wall portion 14 (in particular, see FIGS. 3 and 4B).

The inner wall portion 12 is formed as a cylindrical surface, has an inner surface 12i that comes into contact with an outer surface of the center vent tube CVT and an outer surface 12o, and a thread portion 12t that meshes with a thread portion 30t of the nut 30 to be described later is provided in the outer surface 12o. Additionally, multiple (three in the example of FIG. 3) rearwardly protruding tabs 12p are provided at regular intervals in the circumferential direction at the rear end of the inner wall portion 12.

The radial wall portion 14 has a partially cut ring shape. Two side surfaces 14e corresponding to the cut surfaces are planes parallel to a plane including an axis CL, and are spaced from the plane at an equal distance (offset distance). The outer wall portion 16 protrudes rearward from each of the two arc-shaped portions of the outer edge of the radial wall portion 14.

Each of the two outer wall portions 16 is an arc-shaped part having an inner surface 16i that faces the outer surface 12o of the inner wall portion 12. A hole 16a that radially penetrates the outer wall portion 16 while straddling the radial wall portion 14 is provided in a circumferential center portion of the outer wall portion 16. Additionally, a hole 12a formed on the same axis as the hole 16a and having a slightly smaller diameter is formed so as to straddle and penetrate the inner wall portion 12 and the radial wall portion 14.

Also, a positioning pin 10p is press-fitted into the hole 12a. The positioning pin 10p is press-fitted such that a radially inner end face thereof is located slightly radially outward of the inner surface 12i of the inner wall portion 12. A radially outer part of the positioning pin 10p is formed to be accommodated in a cutout 24Fn of a ring segment 22 to be described later in an assembled state of the support device 1. Note that at the time of press-fitting, the positioning pin 10p can be inserted from the radially outer side through the hole 16a having a slightly larger diameter than the hole 12a.

As shown in FIG. 3, the ring 20 is a member formed of a pair of ring segments 22, and each ring segment is formed of a radially inner bore portion 24, a radially outer rim portion 26, and a web portion 28 that extends radially between the bore portion 24 and the rim portion 26 to connect the portions.

The bore portion 24 is a cylindrical part formed of portions protruding to the front and rear from the inner end of the web portion 28. A rear portion of an inner surface 24i of the bore portion 24 is formed as a part of a side surface (conical surface) of a cone (first cone) having a vertex at the front on the axis CL. Additionally, a portion 24F of the bore portion 24 that protrudes frontward has an outer surface formed as a part of a cylindrical surface having a smaller diameter than the diameter of the inner surface 16i of the outer wall portion 16 of the sleeve 10, and an inner surface formed as a part of a cylindrical surface having a larger diameter than the outer surface 12o of the inner wall portion 12 of the sleeve 10. Moreover, the portion 24F includes a groove 24Fg extending over the entire circumference in an outer surface thereof, and includes the cutout 24Fn penetrating the portion 24F in the radial direction in a circumferential center portion of the front end thereof. The cutout 24Fn is formed in a size that can at least partially accommodate the aforementioned positioning pin 10p.

The rim portion 26 is a cylindrical part formed of portions protruding to the front and rear from the outer end of the web portion 28. An outer surface (supporting surface) 26o of the rim portion 26 is formed as a part of a cylindrical surface having a diameter equal to the inner diameter of the low pressure shaft LS.

Here, the shape of the ring segment 22 as viewed from the direction of the axis CL will be described with reference to FIGS. 5A and 5B. Here, FIG. 5A is a diagram showing a rear view of a ring mid-process body 21 obtained in the middle of a step of manufacturing the ring segment 22, and FIG. 5B is a diagram showing a rear view of the pair of ring segments 22 obtained in the end after machining the ring mid-process body 21.

Figure 5A:
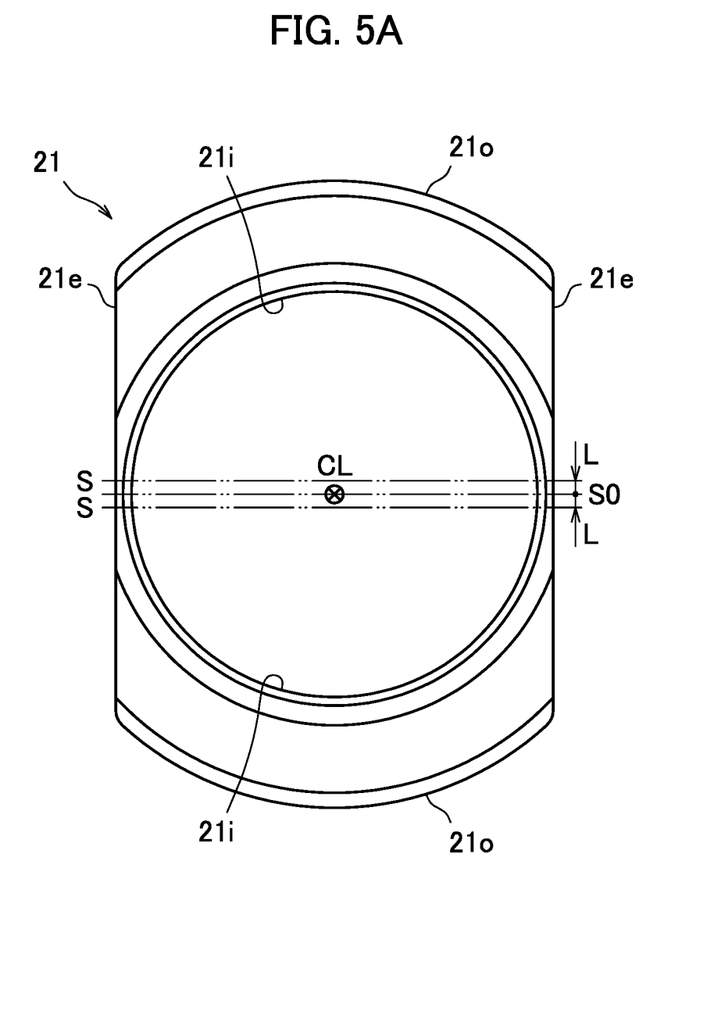
FIG. 5A is a diagram for describing the shape of a ring segment forming the center vent tube support device of the embodiment of the present disclosure, and is a diagram showing a ring mid-process body obtained in the middle of a step of manufacturing the ring segment as viewed from the rear.

As shown in FIG. 5A, the ring mid-process body 21 has a partially cut ring shape. Two side surfaces 21e corresponding to the cut surfaces are planes parallel to a first plane (not shown) including the axis CL, and are spaced from the first plane at an equal distance (first distance). Here, the first distance is set substantially equivalent to the aforementioned offset distance of the radial wall portion 14 of the sleeve 10. As a result, the distance between the two side surfaces 21e of the ring mid-process body 21 (width of ring mid-process body 21) is substantially equivalent to the distance between the two side surfaces 14e of the radial wall portion 14 of the sleeve 10 (width of radial wall portion 14).

Additionally, outer surfaces 21o (two) of the ring mid-process body 21 are formed as parts of a cylindrical surface having a diameter equal to the inner diameter of the low pressure shaft LS. A rear portion of an inner surface 21i of the ring mid-process body 21 is formed as a part of a side surface (conical surface) of a cone (first cone) having a vertex at the front on the axis CL. Since the outer surface 21o and the inner surface 21i thus have an axisymmetric shape, they can be formed by turning, for example.

Figure 5B:
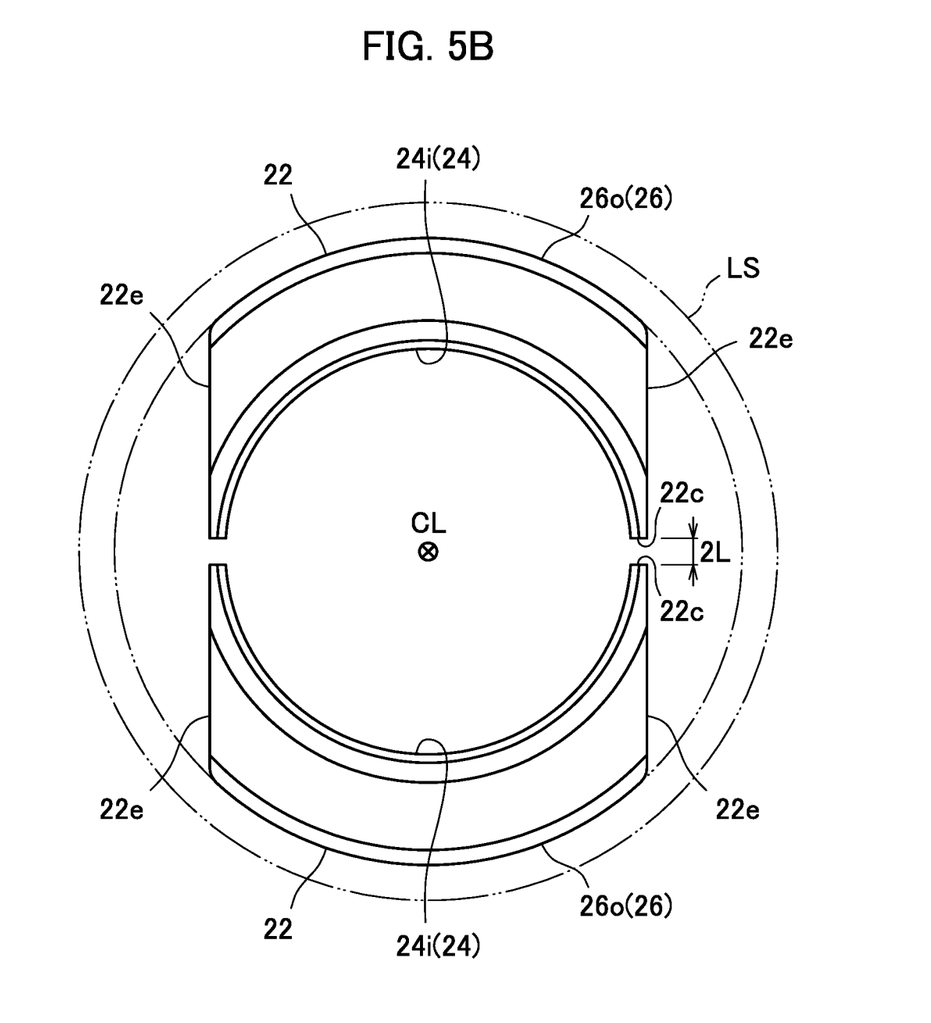
FIG. 5B is a diagram for describing the shape of the ring segment forming the center vent tube support device of the embodiment of the present disclosure, and is a diagram showing a pair of ring segments obtained in the end by machining the ring mid-process body, as viewed from the rear.

By cutting the ring mid-process body 21 in the above-mentioned form along two planes S shown in FIG. 5A, the pair of ring segments 22 shown in FIG. 5B are obtained. Here, the two planes S are planes parallel to a plane S0 (second plane) that includes the axis CL and is perpendicular to the side surface 21e of the ring mid-process body 21 (in other words, perpendicular to the aforementioned first plane), and are spaced from the plane S0 at an equal distance L (second distance). Note that after the ring mid-process body 21 is cut along the two planes S, the outer surface 21o, the inner surface 21i, and the side surface 21e of the ring mid-process body 21 become the outer surface 26o (of rim portion 26), the inner surface 24i (of bore portion 24), and a side surface 22e of the ring segment 22, respectively.

Here, the diameter of the cylindrical surface forming each of the outer surface and the inner surface of the frontwardly protruding portion 24F of the bore portion 24 of each ring segment 22, and the aforementioned distance L are set to such values that allow the portion 24F to be accommodated in a space defined by the inner wall portion 12, the radial wall portion 14, and the outer wall portion of the sleeve 10 when end faces 22c (surfaces corresponding to planes S) of the pair of ring segments 22 are brought into contact with each other.

In the ring 20 formed of the pair of ring segments 22 manufactured in the above manner, when the end faces 22c of the two ring segments 22 are separated by a distance 2L while maintaining a parallel state, the outer surface 26o (of rim portion 26) of the ring 20 comes into close contact with the inner surface of the low pressure shaft LS, as shown in FIG. 5B.

Note that the ring 20 includes, as an accessory member, a connection ring 20R provided around the outer surface of the frontwardly protruding portion 24F of the bore portion 24 to keep the pair of ring segments 22 close to each other as will be described later, when assembling the support device 1. The groove 24Fg included in the bore portion 24 is formed so that the connection ring 20R can be fit thereinto.

The connection ring 20R is an elastic annular member, and a resin ring or a metal piston ring may be used, for example. By placing the pair of ring segments 22 with the end faces 22c in contact with each other and fitting the connection ring 20R into the groove 24Fg of the bore portion 24 while expanding the inner diameter of the connection ring 20R, the pair of ring segments 22 can be held close to each other. This can prevent the ring 20 formed of the pair of ring segments 22 from falling apart when the temporarily assembled support device 1 is inserted into the low pressure shaft LS and moved to a predetermined axial position, as will be described later.

While the connection ring 20R is a member necessary for assembling the support device 1 as described above, it is a member that does not have any specific function after assembly, that is, during operation of the engine. On the other hand, the connection ring 20R is stretched radially outward by centrifugal force that acts during operation of the engine and may break, and the broken piece may fall into a space between the low pressure shaft LS and the center vent tube CVT from the groove 24Fg. To prevent such a situation, the aforementioned outer wall portion 16 of the sleeve 10 is provided to cover the connection ring 20R fitted into the groove 24Fg from the radially outer side in the assembled state of the support device 1.

The nut 30 is an annular member, and has an inner surface 30i and an outer surface 30o formed as substantially cylindrical surfaces. The thread portion 30t that meshes with the thread portion 12t provided on the outer surface 12o of the inner wall portion 12 of the sleeve 10 is provided on the inner surface 30i. Additionally, a front portion of the outer surface 30o is formed as a part of a side surface (conical surface) of a cone (second cone) having a vertex at the front on the axis CL. Meanwhile, multiple (three in the example of FIG. 3) rearwardly protruding tabs 30p are provided at regular intervals in the circumferential direction at the rear end of the nut 30.

Here, the first cone whose side surface forms the rear portion of the inner surface 24i of the bore portion 24 of the ring segment 22 and the second cone whose side surface forms the front portion of the outer surface 30o of the nut 30 are geometrically the same cone. That is, the conical surface forming the rear portion of the inner surface 24i of the bore portion 24 of the ring segment 22 and the conical surface forming the front portion of the outer surface 30o of the nut 30 have an equivalent vertex angle.

Accordingly, when the nut 30 is screwed onto the outer periphery of the inner wall portion 12 of the sleeve 10 and moved forward while restricting axial movement of the ring segment 22 with the rear portion of the inner surface 24i of the bore portion 24 of the ring segment 22 and the front portion of the outer surface 30o of the nut in contact with each other, the front portion (pressurizing surface) of the outer surface 30o of the nut pushes up the rear portion (bearing surface) of the inner surface 24i of the bore portion 24 of the ring segment 22 to the radially outer side while in close contact therewith. By using this to push the outer surface 26o of the rim portion 26 of the ring segment 22 against the inner surface of the low pressure shaft LS and generating reactive force, the ring segment 22 can be held, and therefore radial displacement of the center vent tube CVT fitted to the inner side of the sleeve 10 can be restricted.

Hereinafter, the procedure of assembling the support device 1 configured in the above manner and mounting the support device 1 to the inside of the low pressure shaft LS of the turbofan engine TF will be described.

(1) Place the pair of ring segments 22 with the end faces 22c in contact with each other, and fit the connection ring 20R into the groove 24Fg of the bore portion 24 while expanding the inner diameter of the connection ring 20R. With this, the pair of ring segments 22 can be held close to each other.

(2) Fit the pair of ring segments 22 unified by the connection ring 20R into the sleeve 10 from the rear. That is, bring the pair of ring segments 22 close to the radial wall portion 14 of the sleeve 10 such that the inner surface 24i of the bore portion 24 passes the outer side of the outer surface 12o of the inner wall portion 12 of the sleeve 10. At this time, adjust the circumferential position of both members, so that the cutout 24Fn provided at the front end of the bore portion 24 of each ring segment 22 is in phase with the positioning pin 10p press-fitted into the hole 12a of the sleeve 10. As a result, when the front surface of the bore portion 24 of each ring segment 22 comes into contact with the radial wall portion of the sleeve 10, the positioning pin 10p is accommodated in the cutout 24Fn, and relative movement in the circumferential direction of the sleeve 10 and each ring segment 22 is restricted. Accordingly, when the temporarily assembled support device 1 is inserted into the low pressure shaft LS of the turbofan engine TF as will be described later, the support device 1 can be securely passed through a small-diameter portion SD of the low pressure shaft LS by keeping the side surface 14e of the radial wall portion 14 of the sleeve 10 and the side surface 22e of the ring segment 22 parallel to each other, and reducing the projected shape in the direction of the axis of the turbofan engine TF.

(3) Screw the nut 30 into the outer surface 12o of the inner wall portion 12 of the sleeve 10 to a position where the front portion (conical surface) of the outer surface 30o and the rear portion (conical surface) of the inner surface 24i of the bore portion 24 of the ring segment 22 come into contact with each other. At this time, the end faces 22c of the pair of ring segments 22 are still in contact with each other.

(4) Insert the assembly in the state of (3) into the low pressure shaft LS of the turbofan engine TF from the rear.

Here, the low pressure shaft LS has, in the vicinity of the rear end thereof, the small-diameter portion SD (see FIG. 1) whose inner diameter is smaller than that of the position where the support device 1 is to be placed. In order to pass the support device 1 through such a small-diameter portion SD, the radial wall portion 14 of the sleeve 10 and the ring 20 formed of the pair of ring segments 22 have a partially cut ring shape as described above.

As a result, in the assembly in the state of (3), the diameter of a circle circumscribing the projected shape (Specifically, shape shown in bottom view of FIG. 2. Hereinafter referred to as vertical projected shape) of the ring segment 22 in a direction perpendicular to the end face 22c of the ring segment 22 (i.e., vertical direction in FIG. 2) is smaller than the diameter of a circle circumscribing the projected shape (Specifically, shape of rear view of FIG. 2 where two ring segments 22 are brought close to each other and end faces 22c are in contact with each other. Hereinafter referred to as axial projected shape) of the ring segment 22 in the axis CL direction. The diameter of a circle circumscribing the vertical projected shape of the assembly in the state of (3) is set smaller than the diameter of the small-diameter portion SD of the low pressure shaft LS. That is, the shape of the radial wall portion 14 of the sleeve 10 and the ring mid-process body 21 which is the state of the pair of ring segments 22 before machining, specifically, the position of the plane along which to cut the original ring (i.e., offset distance and first distance), is selected such that the vertical projected shape of the assembly in the state of (3) satisfies the condition described above.

Since the sleeve 10 and the pair of ring segments 22 are configured in the above manner, when the assembly in the state of (3) is rotated 90 degrees to the rear (see arrows shown in side view of FIG. 2), for example, from the state where its axis CL direction coincides with the direction of the axis of the turbofan engine TF, the projected shape in the direction of the axis of the turbofan engine TF changes from the axial projected shape to the vertical projected shape, and is downsized. Hence, the assembly can be passed through the small-diameter portion SD of the low pressure shaft LS as shown as an image in the bottom view of FIG. 2.

After passing the assembly in the state of (3) through the small-diameter portion SD in this manner, insert the assembly further into the low pressure shaft LS, and when it reaches the position where the support device 1 is to be placed, rotate the assembly 90 degrees in a direction opposite to the aforementioned direction. Then, by using an appropriate jig, hold the assembly in the state of (3) and the low pressure shaft LS in a substantially coaxial state.

(5) Insert a dual-cylinder fastening jig formed of an internal cylinder including, at the tip end thereof, the same number of claws in the same radial position as the tabs 12p of the sleeve 10, and an external cylinder including, at the tip end thereof, the same number of claws in the same radial position as the tabs 30p of the nut 30 into the low pressure shaft LS from the rear. Screw the nut 30 further into the outer surface 12o of the inner wall portion 12 of the sleeve 10 by bringing the claws of the internal cylinder into contact with the tabs 12p in the circumferential direction to restrict rotation of the sleeve 10, and bringing the claws of the external cylinder into contact with the tabs 30p in the circumferential direction and rotating the nut 30.

At this time, although the front portion (pressurizing surface) of the outer surface 30o of the nut 30 formed as a conical surface pushes forward the rear portion (bearing surface) of the inner surface 24i of the bore portion 24 of the ring segment 22 formed as the conical surface having the same vertex angle as the above conical surface, since the front surface of the bore portion 24 is in contact with the radial wall portion 14 of the sleeve 10 and thereby restricted from moving in the axial direction, the ring segment 22 is pushed up radially outward.

When the nut 30 is further screwed in this manner, in the end, the outer surface 26o of the rim portion 26 of each ring segment 22 comes into contact with the inner surface of the low pressure shaft LS. When the external cylinder of the fastening jig is further rotated from this state until a predetermined torque is applied, the outer surface 26o of the rim portion 26 of each ring segment 22 receives a predetermined degree of reactive force from the inner surface of the low pressure shaft LS. Thus, the support device 1 is mounted in the proper state.

After mounting a predetermined number of the support devices 1 in the above manner onto predetermined positions, the center vent tube CVT is inserted into the low pressure shaft LS, and is supported by the inner surface 12i of the inner wall portion 12 of the sleeve 10 of the support devices 1.

As has been described, the support device 1 of the embodiment of the present disclosure is configured such that the ring 20 placed between the center vent tube CVT and the main shaft (low pressure shaft LS) through the sleeve 10 is formed of the pair of ring segments 22, and comes into contact with the inner surface of the main shaft on the supporting surface (outer surface 26o of rim portion 26 of ring segment 22) formed as a part of a cylindrical surface having a diameter equal to the inner diameter of the main shaft.

Accordingly, when bringing the supporting surface of the ring segment 22 into contact with the inner surface of the main shaft at the time of assembly of the support device 1, each ring segment 22 only moves in the radial direction and does not deform. Additionally, even after assembly, since the supporting surface of the ring segment 22 is in close contact with the inner surface of the main shaft, there is no fear of deformation. Hence, the sleeve 10 placed between the ring segment 22 and the center vent tube CVT is also unlikely to deform.

As has been described, in the support device 1 of the embodiment of the present disclosure, the contacting state between the ring 20 and the main shaft, and between the sleeve 10 and the center vent tube CVT are both even in the circumferential direction. As a result, an excellent effect of preventing transmission of abnormal load between the members and preventing abrasion of the contact surface can be achieved.

Note that while the above description has been given by using the example in which the pressurizing surface having the function of coming into contact with the bearing surface (rear portion of inner surface 24i of bore portion 24) of the ring segment 22 and pushing up the ring segment 22 radially outward is provided in the front portion of the outer surface 30o of the nut 30, other configurations can be adopted. That is, the pressurizing surface may be provided in an outer surface of an inner wall portion of the sleeve. In this case, since the nut is to be screwed from the rear, the conical surface forming the pressurizing surface and the bearing surface need to be a side surface of a cone having a vertex at the rear on the axis.

Figure 6A:
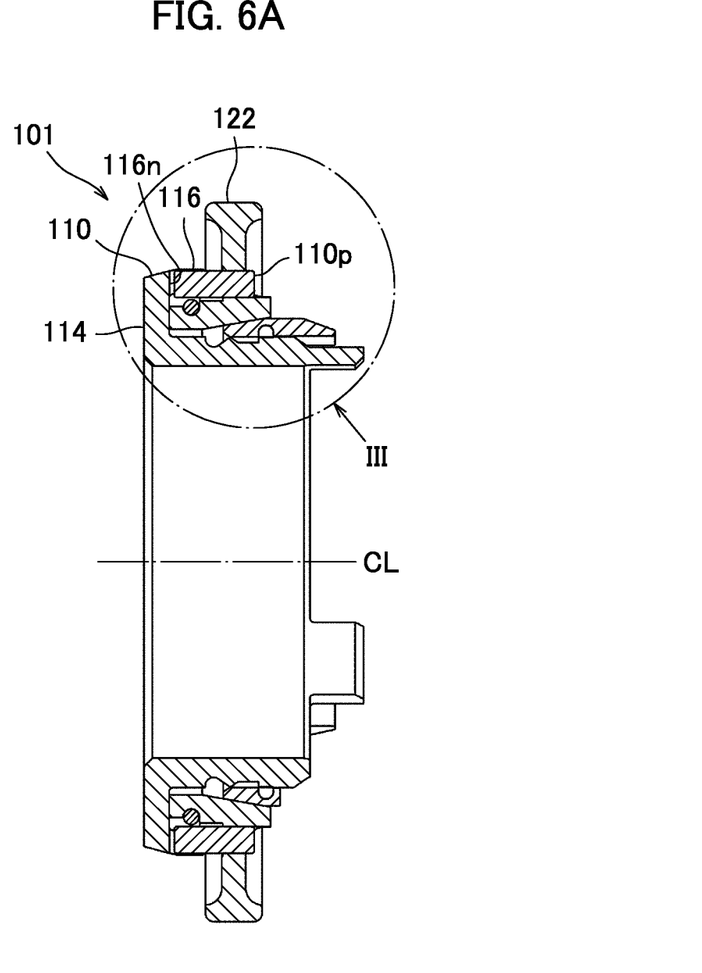
FIG. 6A is a cross-sectional view of a modification of the center vent tube of the embodiment of the present disclosure corresponding to FIG. 4A.
Figure 6B:
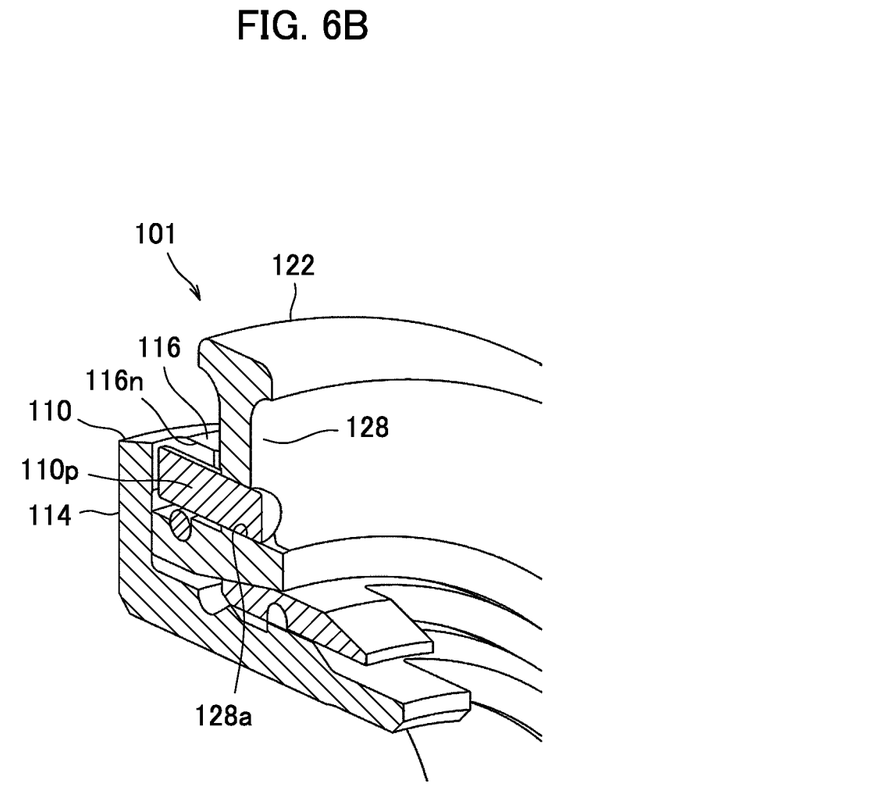
FIG. 6B is an enlarged perspective view of part III of FIG. 6A of the modification of the center vent tube of the embodiment of the present disclosure.

Additionally, while the above description has been given by using the example in which, as a method of restricting relative movement of the sleeve 10 and the ring segment 22 in the circumferential direction, the positioning pin 10p is fixed (press-fitted into hole 12a) to the sleeve 10 and the cutout 24Fn accommodating the positioning pin 10p is provided in the ring segment 22 (front end of bore portion 24), other configurations can be adopted. A modification adopting an alternative configuration is shown in FIGS. 6A and 6B.

In the modification, a positioning pin 110p is press-fitted into a hole 128a axially penetrating a web portion 128 of a ring segment 122 and fixed in a frontwardly protruding state. Additionally, a cutout 116n radially penetrating while straddling a radial wall portion 114 and an outer wall portion 116 is provided in a circumferential center portion of a sleeve 110.

With this configuration, in an assembled state of a support device 101, the positioning pin 110p is accommodated in the cutout 116n, so that relative movement of the sleeve 110 and each ring segment 122 in the circumferential direction can be restricted.

(Aspect of Present Disclosure)

A center vent tube support device of a first aspect of the present disclosure is a center vent tube support device for supporting a center vent tube inside a hollow main shaft of a turbofan engine, the center vent tube support device including: an annular sleeve having an inner surface that comes into contact with an outer surface of the center vent tube; a ring formed of a pair of ring segments and placed between the sleeve and the main shaft; and an annular nut for fixing the ring to the sleeve, in which: an outer surface of the sleeve or the nut includes a pressurizing surface formed as a conical surface; each of the ring segments includes a supporting surface formed as a part of a cylindrical surface having a diameter equal to an inner diameter of the main shaft in a portion where the device is to be installed, a bearing surface formed as a part of a conical surface having a vertex angle equal to that of the conical surface forming the pressurizing surface, a pair of side surfaces formed as planes parallel to a first plane including an axis and each spaced from the first plane at a first distance, and a pair of end faces formed as planes each spaced from a second plane including the axis and perpendicular to the first plane at a second distance; the supporting surface is formed of at least a part of an outer surface of a cylindrical rim portion of the ring segment; the bearing surface is formed of at least a part of an inner surface of a cylindrical bore portion of the ring segment; a connection ring is provided around an outer surface of the bore portion of the pair of ring segments; and a diameter of a circle circumscribing a projected shape of the device in a direction perpendicular to the second plane is smaller than an inner diameter of a smallest-diameter portion of the main shaft.

In a center vent tube support device of a second aspect of the present disclosure, of the sleeve and the ring segment, a positioning pin is fixed to a first part, a cutout is provided in a second part, and the positioning pin and the cutout work in relation with each other to restrict relative movement of the sleeve and the ring segment in the circumferential direction.

EXPLANATION OF REFERENCE SIGNS

1 center vent tube support device
10 sleeve
20 ring
22 ring segment
24 bore portion (of ring segment)
24i inner surface (bearing surface) (of bore portion)
26 rim portion (of ring segment)
26o outer surface (supporting surface) (of rim portion)
30 nut
30o outer surface (pressurizing surface) (of nut)
TF turbofan engine
LS low pressure shaft (main shaft)
CVT center vent tube

The invention claimed is:

1. A device for supporting a center vent tube inside a hollow main shaft of a turbofan engine, the device comprising:
   an annular sleeve having an inner surface that comes into contact with an outer surface of the center vent tube;
   a ring formed of a pair of ring segments and placed between the sleeve and the main shaft; and
   an annular nut for fixing the ring to the sleeve, wherein:
   an outer surface of the sleeve or the nut includes a pressurizing surface formed as a conical surface;
   each of the ring segments includes
      a supporting surface formed as a part of a cylindrical surface,
      a bearing surface formed as a part of a conical surface having a vertex angle equal to that of the conical surface forming the pressurizing surface,
      a pair of side surfaces formed as planes parallel to a first plane including an axis and each spaced from the first plane at a first distance, and
      a pair of end faces formed as planes each spaced from a second plane including the axis and perpendicular to the first plane at a second distance;
   the supporting surface is formed of at least a part of an outer surface of a cylindrical rim portion of the ring segment;
   the bearing surface is formed of at least a part of an inner surface of a cylindrical bore portion of the ring segment;
   the main shaft has a small-diameter portion having a diameter that is smaller than that of a position where the device is to be placed;

in a state where the end faces of the pair of ring segments are brought into contact with each other by providing a connection ring around an outer surface of the bore portion of the pair of ring segments, a diameter of the cylindrical surface forming the supporting surface is equal to an inner diameter of the main shaft in a portion where the device is to be installed; and a diameter of a circle circumscribing a projected shape of the device in a direction perpendicular to the second plane is smaller than an inner diameter of the main shaft at the small-diameter portion.

2. The device according to claim 1, wherein of the sleeve and the ring segment, a positioning pin is fixed to a first part, a cutout is provided in a second part, and the positioning pin and the cutout work in relation with each other to restrict relative movement of the sleeve and the ring segment in the circumferential direction.

* * * * *